United States Patent [19]
Damijonaitis et al.

[11] 3,758,859

[45] Sept. 11, 1973

[54] MAGNETIC TACHOMETER PICKUP

[75] Inventors: Algis Damijonaitis, Chicago; Daryl D. Wiley, Elmhurst, both of Ill.

[73] Assignee: Motorola, Inc., Franklin Park, Ill.

[22] Filed: Oct. 29, 1971

[21] Appl. No.: 193,911

[52] U.S. Cl. ............................... 324/174, 310/168
[51] Int. Cl. ........................................... G01p 3/48
[58] Field of Search................. 324/166, 173, 174, 324/161; 73/119 A; 310/155, 168

[56] References Cited
UNITED STATES PATENTS
3,581,561   6/1971   Tomashek.......................... 324/173
FOREIGN PATENTS OR APPLICATIONS
613,185   1/1961   Canada............................ 324/174

*Primary Examiner*—Michael J. Lynch
*Attorney*—Foorman L. Mueller et al.

[57] ABSTRACT

An encapsulated magnetic tachometer pickup for insertion in an aperture of a fuel or oil pump housing for detecting the rotational speed of a gear in the pump which is driven in proportion to engine RPM includes a pole piece adapter substantially perpendicular to and radially extending from the axis of the pole piece and connected thereto. The adapter is positioned to have the teeth of the pump gear move transversely across its sensing portion when the gear rotates. A magnet connected to the pole piece causes a magnetic field to be generated in the pole piece and pole piece adapter which changes as the result of the rotation of the gear across the sensing portion of the pole piece adapter. The changing flux induces a current in a coil mounted on the pole piece which in turn is connected to a signal translating network for indicating engine RPM.

6 Claims, 5 Drawing Figures

INVENTORS
ALGIS DAMIJONAITIS
DARYL D. WILEY
BY Mueller & Aichele
ATTORNEYS

MAGNETIC TACHOMETER PICKUP

BACKGROUND OF THE INVENTION

When using diesel engines in industrial or construction equipment, it is desirable to know the speed of rotation of the engine, and of various other operations performed by the equipment. In over the road vehicles, proper gear shifting also requires a knowledge of engine speed. Tachometer devices for indicating engine speed have taken various forms. One common tachometer arrangement is a mechanical device which utilizes a helical gear found in a fuel or oil pump, as a diesel engine which is connected through a wormtype pickup gear and flexible cable to a shaft which rotates the mechanical speed indicator.

Several problems exist with this type of mechanical tachometer pickup including twisting and breakage of the cable between the mechanical pickup gear and the tachometer indicator itself. Another problem, which results in generally the most expensive repairs, is the necessity of replacing the entire pump if the helical gear malfunctions or the pickup apparatus otherwise becomes mechanically inoperable. In the case of fuel pumps, metal particles resulting from wear and tear of the rotating gears may be carried by the fuel to the fuel injectors to clog the same. A further problem with mechanical pickups is the wearing out of the seal for the rotating shaft of the pickup. Disruption of engine operation thus results because of air entering the pump and causing vapor lock.

SUMMARY OF THE INVENTION

Accordingly, it is an object of this invention to provide a reliable and relatively inexpensive tachometer pickup for use in connection with a mechanical pump.

It is another object of the present invention to provide a magnetic tachometer pickup which may be installed in pumps as a replacement for the existing mechanical pickup.

It is a further object of this invention to provide a magnetic tachometer pickup for a fuel pump which reduces the contamination of the fuel.

It is yet another object to maintain pump sealing with the pickup installed.

Briefly, the magnetic pickup of this invention includes a permanent magnet, a pole piece connected thereto and around which a coil is mounted, and a pole piece adapter in which changes in magnetic flux are produced. Conductor rods with terminals are connected to the coil and to the structure for securing together the pole piece adapter, magnet, coil and terminals. The structure with parts secured thereto is encased in a cylindrical mold of a phenolic compound for insertion in and securing to a pump housing. The adapter projects from the free end of the pole piece at substantially right angles with respect to the pole piece axis and is positioned so that teeth of a rotating helical gear used in the pump pass transversely across the face thereof to cause changes in the magnetic flux in the pole piece thereby inducing a current in the coil. In one embodiment, the adapter has fingers which are spaced to correspond substantially to the tooth spacing of the gear and is used where the teeth are relatively close together so that movement of the gear causes a sufficient change in magnetic flux in the individual adapter fingers as each tooth passes the individual fingers to activate the tachometer indicator. A single finger adapter having a larger sensing area than the multiple finger adapter can be used in some pumps where the gear teeth are wider and/or are more widely spaced.

DETAILED DESCRIPTION

Figure 1:
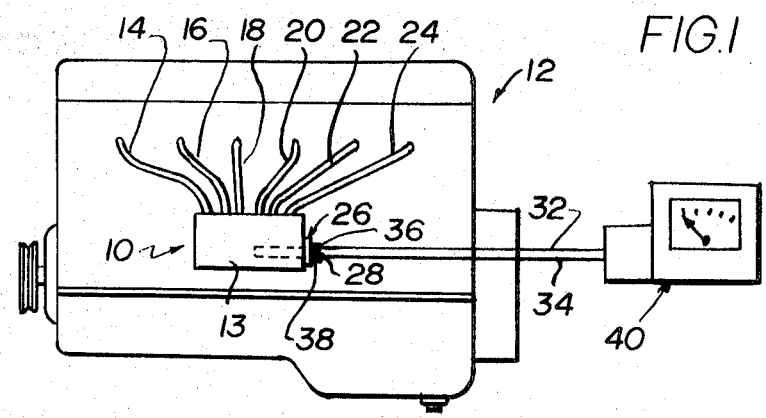
FIG. 1 is a side elevation view of a diesel engine with a fuel pump having the magnetic tachometer pickup of this invention.
Figure 2:
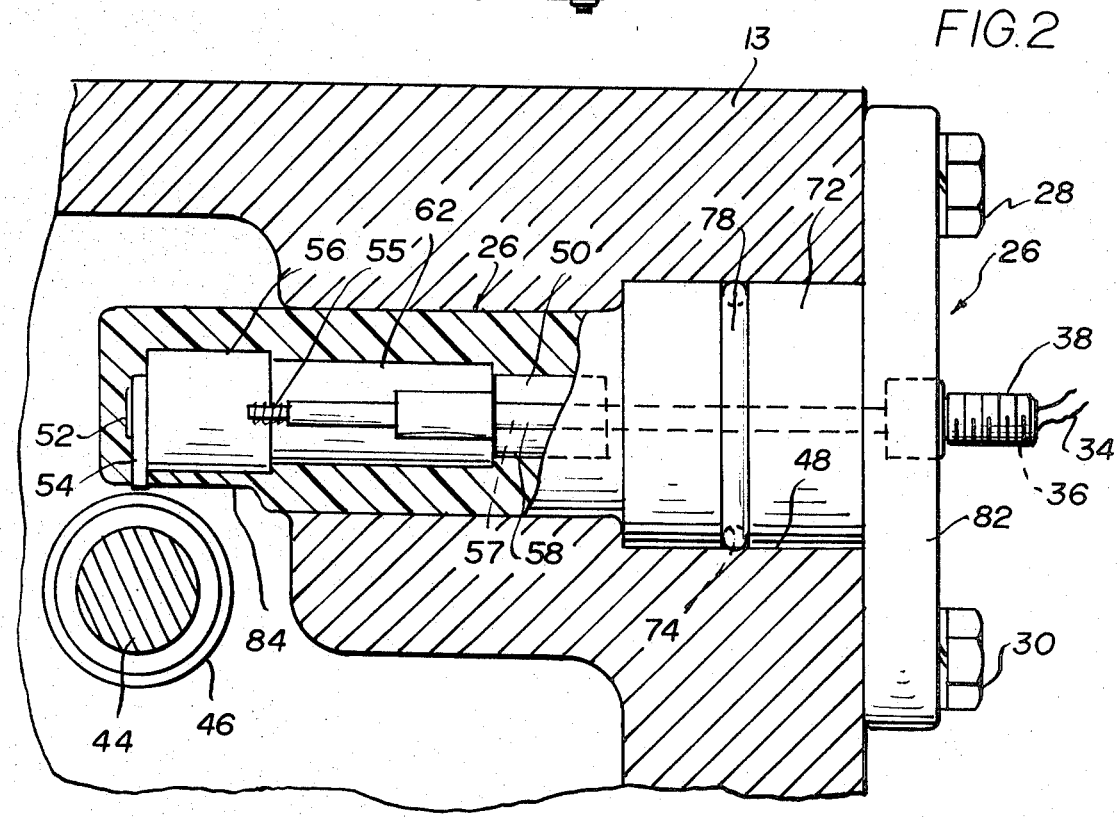
FIG. 2 is a side elevation view in partial cross-section of the magnetic tachometer pickup of this invention mounted in a fuel pump.
Figure 3:
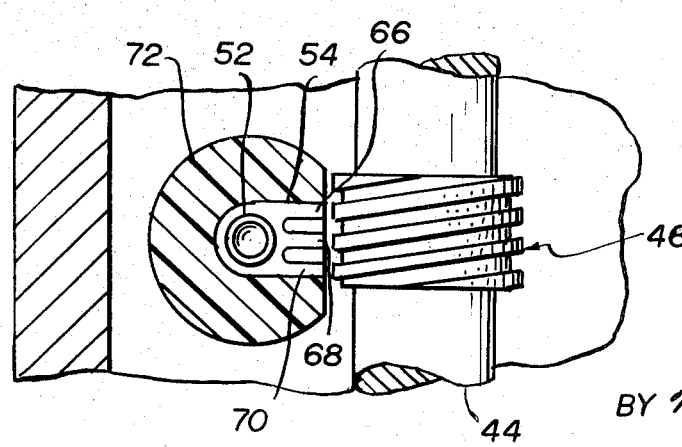
FIG. 3 is an elevation view in partial cross-section of a portion of the pickup adapter of the present invention shown in spaced relation with the rotating pump shaft.

FIGS. 1–3 illustrate a fuel pump 10 mounted on the side of a diesel engine 12 for supplying fuel thereto through tubes 14, 16, 18, 20, 22 and 24. The pump includes a helical gear 46 positioned on shaft 44 in the pump housing 13 (FIG. 2). The shaft 44 is driven by the engine 12 in direct proportion to the engine RPM. A pickup 26 is inserted into the fuel pump and mounted by studs 28 and 30 for picking up signals from the rotating helical gear 46. A pair of conductors or leads 32 and 34 extend from the pickup terminals 36 and 38 and are fastened to tachometer 40 of the commercially available type such as Motorola, Inc. tachometer model No. 7SP2015.

The aperture 48 through which the magnetic tachometer pickup 26 is inserted into the fuel pump is the same as those included in many original equipment diesel engines for receiving a mechanical pickup which is driven by the helical gear 46. Therefore, the mechanical tachometer pickups formerly used may be readily replaced with the magnetic tachometer pickups of the present invention without altering the structure of the fuel pump.

The pickup device includes a magnet 50 connected to a pole piece 52 which is secured to a pole piece adapter 54 which projects substantially radially from and normal to the axis of the pole piece 52. A coil 56 encircles the pole piece 52, having an electrical signal induced therein by changes in the magnetic flux in the pole piece adapter 54. The output wires 55 of the coil are connected to separate conductor rods, one being rod 58 which is in turn connected to terminal 38, and the other being rod 57 (not visible) which is connected to terminal 36. A nylon structure 62 holds together the conductor rods, magnet 50, pole piece 52 and coil 56 as described more specifically in U.S. application Ser. No. 193,838. filed on even date herewith and assigned to the assignee of this application. The pole piece adapter 54 is connected to the end portion of the pole piece 52 by rolling over the same or by securing it to the pole piece with a retaining clip or some other securing means.

The magnetic tachometer pickup has been used in one fuel pump having a helical gear with specifications including a lead of 9, a diametral pitch of 32, a 72° helix angle and 0.91 pitch diameter. The pole piece adapter 54 generates a pulse signal in the coil 56 with changes in the magnetic flux in the finger portions 66, 68 and 70. Axial movement of the gear teeth of the helical gear 46 upon rotation thereof in proportion to engine RPM causes the teeth to transversely pass the sensing portions of the adapter causing the fingers to simultaneously sense changes in the magnetic flux, and in turn to cause current to be induced in the coil to produce a pulse signal in the output at terminals 36 and 38. Because the gear teeth are close together, the multi-finger pickup is especially useful in the helical gear having the aforementioned specifications. Utilizing a single pole piece adapter would greatly reduce the magnitude of the signal produced because of a smaller variation of magnetic flux. Even with a larger sensing portion, the magnitude of the flux variation would be reduced because the adapter would cover at any given time a gear tooth and space and would consequently result in substantially no change in magnetic flux.

Figure 4:
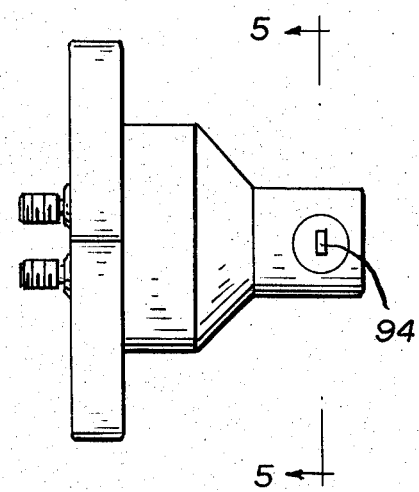
FIG. 4 is a side elevation view of another embodiment of a tachometer pickup in accordance with this invention.
Figure 5:
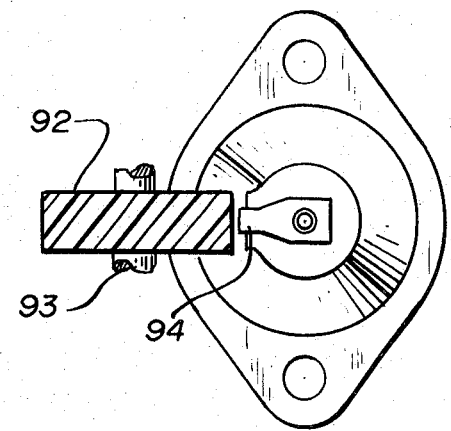
FIG. 5 is a side elevation view in partial cross-section of the embodiment shown in FIG. 4 taken along lines 5—5 with a helical gear from a pump.

The change in magnetic flux at the sensing area is conducted through the pole piece which results in a current being induced in the coil 56. It is the magnet 50 which creates a magnetic field to produce magnetic flux with the gear transversing the sensing portions to cause the flux to change therein.

Where gear teeth are spaced apart as with the helical gear 92 on shaft 93 of one oil pump having a lead of 14, a diametral pitch of 11, a 45° helix angle, and a 0.180 pitch diameter, a single pole piece adapter 94 as shown in FIGS. 4 and 5 can provide a pulse of sufficient amplitude to energize the tachometer indicator. The gear teeth are spaced widely enough apart so there is little if any overlapping of a gear tooth and space by the sensing portion of a single finger pickup.

A significant advantage of the magnetic tachometer pickup as hereinbefore described is provided by the pickup adapter secured to the end of the pole piece because changes in magnetic flux are conducted through the pole piece and consequently induce a current in the coil. With existing fuel and oil pumps, where mechanical tachometer pickups have been used, the pickup adapter provides accessability to the rotating gear of the pump device to provide a change in magnetic flux in the pole piece to induce an electrical pulse in the coil of the pickup adapter which is connected to the signal detecting network.

With fuel pumps and for that matter oil pumps and other types of pumps, the entire magnetic pickup 26 is encapsulated with a molding compound such as a phenolic to form an enlarged cylindrical body portion 72 to fit within existing aperture 48 of the pump housing 13. The body portion is provided with groove 74 for receiving O ring 78 to seal the pickup device with the pump housing to prevent fuel leaks, while the flange portion 82 of the pickup device 26 is secured to the pump housing with mounting studs 28 and 30.

Referring to FIG. 2 the pole piece adapter 54 is positioned in a flat undercut portion 84 formed at the end of the cylindrical body 72. The adapter is positioned and milled so that there is no physical contact with the rotating gear, thus assuring no minute particles of metal will break off. Consequently, with a fuel pump, the possibility of clogging of the fuel injectors is reduced. Since there are no mechanical connections, the possibilities of mechanical failure due to twisting or breaking leads or gear malfunctions are all but eliminated. Also, the absence of moving parts in the magnetic tachometer pickup essentially eliminates one possible cause for vapor lock, that being the wearing out of the tachometer pickup seal.

What has been described therefore is a reliable long lasting magnetic tachometer pickup device which can be used as a replacement for mechanical tachometer pickups in various mechanical pumps such as fuel and oil pumps.

We claim:

1. A tachometer pickup for use in an engine having fuel and oil pumps, a gear mounted in one of said fuel and oil pumps for rotation about an axis, the gear being driven in proportion to engine RPM, said one of said pumps having an aperture through the wall of its housing, with the axis of the aperture being substantially perpendicular to the axis of the gear, said axes being displaced from one another, the tachometer pickup including in combination, a magnetic pickup mounted in a casing which is inserted in said aperture, said magnetic pickup including a core having a magnet for providing a magnetic field therein, a coil mounted on said core, an adapter of flux conducting material secured to said core and extending radially therefrom toward and substantially normal to the axis of said gear, said adapter having a sensing area in proximity to the gear, said casing having a flattened area formed at the free end thereof, said flattened area being undercut toward the axis of said casing a distance sufficient to maintain said casing mechanically free of the gear being positioned adjacent thereto, whereby the rotation of the gear causes magnetic flux in said sensing area of said adapter to change, thereby causing a change in the magnetic flux of the core and inducing a current in said coil.

2. The tachometer pickup arrangement according to claim 1 wherein said magnet comprises a permanent magnet.

3. In a diesel engine system having a tachometer and a pump with a helical gear therein driven in relation to the engine RPM, said pump having a housing with an aperture for receiving a mechanical pickup for the engine tachometer, which pickup meshes with the gear in the pump for mechanically sensing the engine RPM and transmitting the same to the tachometer, the pump housing further having means for securing the mechanical tachometer pickup thereto with the same being fitted into the aperture therein, the combination including a magnetic tachometer pickup for replacing the mechanical pickup, said magnetic pickup including a magnet, a pole piece connected to said magnet, a coil mounted on said pole piece with changes in magnetic flux in said pole piece inducing a current in said coil, mounting means for mounting said magnetic pickup in the aperture of the pump housing in a spaced relation to the gear therein, said mounting means utilizing the means provided on the housing for securing the mechanical tachometer pickup to the housing, whereby movement of the gear by the engine generates pulses in said pickup in relation to engine RPM, and circuit means responsive to the pulses for operating a tachometer for indicating engine RPM.

4. The magnetic pickup according to claim 3 wherein said mounting means includes a casing having flange portions with indexing means, and mounting studs fitting said indexing means for securing said flange portion to the pump.

5. The magnetic pickup according to claim 3 wherein said pickup includes fingers projecting therefrom, said fingers sensing changes in magnetic flux with teeth of said helical gear passing said fingers substantially simultaneously.

6. The combination according to claim 3 wherein said pickup extends into the aperture, said pickup being substantially normal to the axis of said gear.

* * * * *